United States Patent
Manville et al.

(10) Patent No.: US 9,916,458 B2
(45) Date of Patent: Mar. 13, 2018

(54) SECURE CLOUD-BASED STORAGE OF DATA SHARED ACROSS FILE SYSTEM OBJECTS AND CLIENTS

(71) Applicant: EMC IP Holding Company LLC, Hopkinton, MA (US)

(72) Inventors: Thomas Manville, Mountain View, CA (US); Julio Lopez, Mountain View, CA (US); Rajiv Desai, Mountain View, CA (US); Nathan Rosenblum, San Francisco, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 102 days.

(21) Appl. No.: 14/675,439

(22) Filed: Mar. 31, 2015

(65) Prior Publication Data

US 2016/0292429 A1 Oct. 6, 2016

(51) Int. Cl.
*G06F 21/60* (2013.01)
*G06F 17/30* (2006.01)
*G06F 21/62* (2013.01)

(52) U.S. Cl.
CPC ...... *G06F 21/602* (2013.01); *G06F 17/30094* (2013.01); *G06F 17/30097* (2013.01); *G06F 17/30203* (2013.01); *G06F 21/6218* (2013.01); *G06F 21/6272* (2013.01)

(58) Field of Classification Search
CPC ............ G06F 21/602; G06F 17/30094; G06F 21/6272; G06F 21/6218; G06F 17/30203; G06F 17/30097
See application file for complete search history.

(56) References Cited

U.S. PATENT DOCUMENTS

| | | | |
|---|---|---|---|
| 8,626,723 B2 | 1/2014 | Ben-Shaul | |
| 8,782,441 B1 | 7/2014 | Osterwalder | |
| 8,977,660 B1 * | 3/2015 | Xin | H04N 21/23103 707/747 |
| 9,176,871 B1 | 11/2015 | Serlet | |
| 2002/0110269 A1 | 8/2002 | Floeder | |
| 2010/0021069 A1 | 1/2010 | Fan | |
| 2010/0189256 A1 * | 7/2010 | Doehla | H04N 21/85406 380/217 |
| 2011/0196822 A1 | 8/2011 | Zunger | |
| 2011/0276781 A1 * | 11/2011 | Sengupta | G06F 12/0862 711/216 |

(Continued)

*Primary Examiner* — Hosuk Song
*Assistant Examiner* — J. Brant Murphy
(74) *Attorney, Agent, or Firm* — Van Pelt, Yi & James LLP

(57) ABSTRACT

Techniques to provide secure cloud-based storage of data shared across file system objects and clients are disclosed. In various embodiments, a primary encryption key is determined for an object associated with a plurality of component chunks of file system data. The primary encryption key is used to generate for each of said component chunks a corresponding chunk key, based at least in part on the primary encryption key and data comprising or otherwise associated with the chunk. The respective chunk keys are provided to a file system client configured to create and store the object at least in part by encrypting each chunk included in the plurality of component chunks using the chunk key provided for that chunk to generated encrypted chunk data, and combining the encrypted chunk data to create and store the object.

16 Claims, 14 Drawing Sheets

(56) References Cited

U.S. PATENT DOCUMENTS

| | | | |
|---|---|---|---|
| 2012/0158672 A1* | 6/2012 | Oltean | G06F 17/3007 |
| | | | 707/692 |
| 2012/0204024 A1* | 8/2012 | Augenstein | G06F 11/1453 |
| | | | 713/150 |
| 2013/0024687 A1* | 1/2013 | Lumb | G06F 21/62 |
| | | | 713/165 |
| 2013/0101113 A1* | 4/2013 | Cannon | G06F 21/6209 |
| | | | 380/44 |
| 2013/0227287 A1 | 8/2013 | Quinlan et al. | |
| 2013/0290703 A1 | 10/2013 | Resch et al. | |
| 2013/0305039 A1* | 11/2013 | Gauda | G06F 21/6218 |
| | | | 713/153 |
| 2014/0025948 A1* | 1/2014 | Bestler | H04L 9/0863 |
| | | | 713/167 |
| 2014/0082376 A1* | 3/2014 | Roden | H04L 67/1097 |
| | | | 713/193 |
| 2014/0250303 A1* | 9/2014 | Miller | H04L 63/061 |
| | | | 713/171 |
| 2014/0280309 A1* | 9/2014 | Anderson | G06F 17/30598 |
| | | | 707/769 |
| 2015/0026454 A1 | 1/2015 | Boeuf et al. | |
| 2015/0186043 A1 | 7/2015 | Kesselman | |
| 2015/0312342 A1 | 10/2015 | Gunda | |
| 2016/0062918 A1* | 3/2016 | Androulaki | G06F 12/1408 |
| | | | 713/193 |

\* cited by examiner

1002 → A B C D E F

1004 → C D A B E G

US 9,916,458 B2

SECURE CLOUD-BASED STORAGE OF DATA SHARED ACROSS FILE SYSTEM OBJECTS AND CLIENTS

BACKGROUND OF THE INVENTION

Distributed file systems, file sharing services, etc. have been provided. In one approach, a file system client, application, and/or agent running on a client system may receive file system calls made by applications running on the client system, and may be configured to make corresponding calls to a remote file system server, e.g., a metadata server. For example, to store or update a file the file system client may generate and send to the file system metadata server a write request. The write request may identify a plurality of chunks of data desired to be written to a file. The metadata server may be configured to provide a response indicating one or more locations, e.g., in a cloud-based object store, to which the data should be written by the client.

In some distribute file systems, e.g. as a result of de-duplication or other processing, chunks of data stored by the file system may be shared across multiple files and/or across multiple file system clients. In some embodiments, chunks of file system data that may be shared across files and/or clients may need to be stored and managed so as to ensure each user of the file system has secure access to files the user is authorized to access without also providing any user with access to data the user is not entitled to access.

BRIEF DESCRIPTION OF THE DRAWINGS

Various embodiments of the invention are disclosed in the following detailed description and the accompanying drawings.

DETAILED DESCRIPTION

Figure 1:
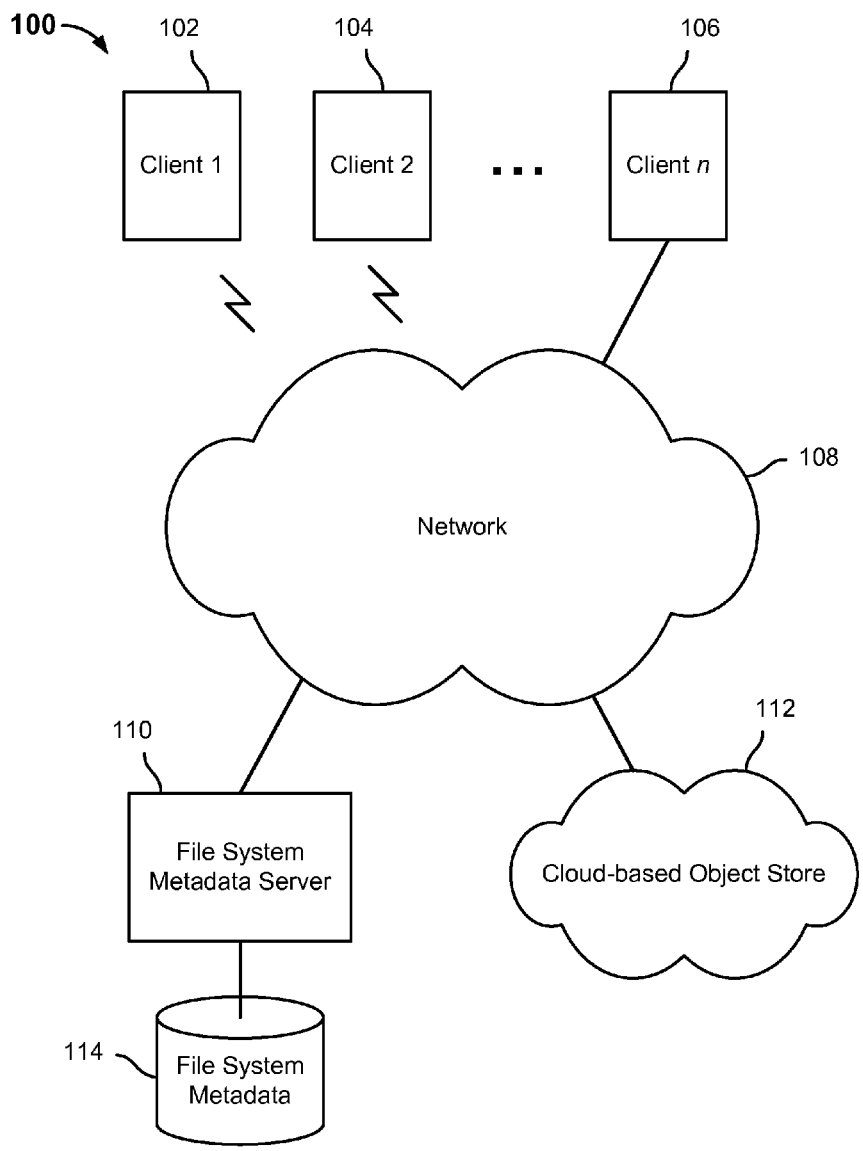
FIG. 1 is a block diagram illustrating an embodiment of a distributed file system and environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A de-duplicating distributed file system that segments files in chunks of a first size for purposes of de-duplication but stores file data in much larger objects to take advantage of the performance characteristics of typical cloud-based object stores is disclosed. In various embodiments, a file system client running on a client device segments a file to be stored into "chunks" of a first size. Data representing the chunks, such as hashes or other representations of the respective chunks, is sent to a remote file system metadata server. The server performs de-duplication processing to determine which, if any, of the chunks may already be stored by the file system. For those chunks that have not yet been stored by the file system, the server responds to the client with instructions to combine a plurality of chunks in a combined object and to store the combined object, e.g., via an HTTP PUT or other request, in a cloud-based object store at a location specified by the server, e.g., using a uniform resource indicator (URI) or other locator provided by the server.

In various embodiments, chunks from different files and/or file system clients may be stored in the same stored object. Security across users and/or file system clients is maintained, in various embodiments, by encrypting the data each respective chunk within a larger stored object in a manner specific to that chunk, enabling access to be controlled on a chunk by chunk basis, e.g., by providing to a file system client only the encryption key(s) required to decrypt those chunks within a stored object that the file system client has retrieved that the client needs to provide access to a specific file, for example.

FIG. 1 is a block diagram illustrating an embodiment of a distributed file system and environment. In the example shown, the distributed file system environment 100 includes a plurality of client systems and/or devices, represented in FIG. 1 by clients 102, 104, and 106. In the example shown, the clients connect (wireless or otherwise) to a network 108, e.g., one or more of a local area network (LAN), a wide area network (WAN), the Internet, and/or one or more other public and/or private networks. The clients have access via network 108 to a file system metadata server 110. Applications on the respective clients, such as clients 102, 104, and 106, make file system calls, which result in various embodiments in corresponding remote calls being made to file system metadata server 110. For example, a file system client, agent, or other entity on the client may intercept or otherwise receive calls by the application to a local (e.g., native) file system, and may redirect such calls to an agent configured to make corresponding remote calls to file system metadata server 110 (e.g., transparently to the application).

In the example shown, data comprising objects stored in the file system, such as files, is stored in a cloud-based object store 112. In some embodiments, files may be segmented into a plurality of segments or "chunks", each of which is stored in a corresponding location in the cloud-based object store. File system calls are made to file system metadata server 110, which stores file system metadata in a file system metadata storage 114, e.g., in a database or other data store. File system metadata server 110 may store in file system metadata store 114, for example, a segment or "chunk" map for each file or other object stored and represented in the file system. For example, for each file name (e.g., pathname) the file system metadata server 110 may store in a corresponding segment map a hash or other representation of each segment, and for each a corresponding location in which the segment is (or is to be) stored in cloud-based object store 112. Other file system metadata, such as metadata typically stored by a file system, may be stored by file system metadata server 110 in file system metadata store 114. Examples include, without limitation, a directory, file, or other node/object name; an identification of parent and/or child nodes; a creation time; a user that created and/or owns the object; a time last modified and/or other time; an end-of-file (EOF) or other value indicative of object size; security attributes such as a classification, access control list, etc.; and/or other file system metadata.

While in the example shown in FIG. 1 the file system metadata server 110 and the cloud-based object store 112 are shown as separate systems, located in different networks and/or physical locations, in other embodiments the file system metadata and file system content data may be stored together, e.g., both on cloud-based resources and/or both on enterprise or other network servers, etc.

Figure 2:
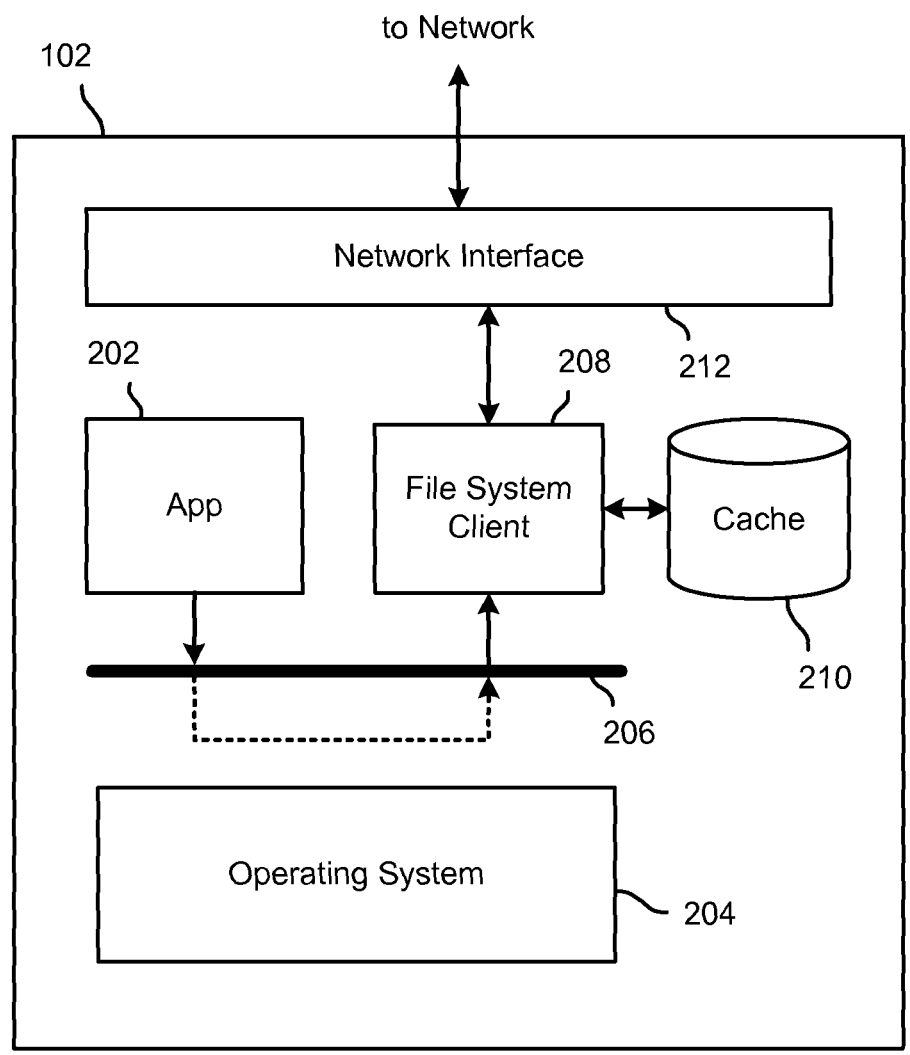
FIG. 2 is a block diagram illustrating an embodiment of a client system.

FIG. 2 is a block diagram illustrating an embodiment of a client system. In the example shown, the client system/device 102 of FIG. 1 is shown to include an application 202 running in an environment provided by an operating system 204. The operating system 204 includes a kernel (not shown) and other components configured to provide services and/or functionality to applications such as application 202. For example, operating system 204 may include and/or be configured to provide access to a native file system (not shown) of client system 102. Application 202 may be configured to make file system calls to the native file system, e.g., to store files or other objects created by/using application 202, to modify, move, or delete such objects, etc. In the example shown, file system calls made by application 202, represented in FIG. 2 by the downward pointing arrow originating in the block labeled "app" (202), are intercepted by a kernel module (or other component) 206 and redirected to a file system client (or other file system agent) 208. In some embodiments, file system agent 208 comprises a client application running in user space. In some embodiments, file system agent 208 comprises a kernel or other operating system component or module. File system client 208 in this example has associated therewith a local cache 210. In various embodiment, cache 210 may be used to buffer and/or otherwise stage file data prior to its being sent to remote storage (e.g., cloud-based object store 112 of FIG. 1), and/or to facilitate access to data stored previously but to which access may be requested later.

The client system 102 includes a network communication interface 212 that provides network connectivity, e.g., to a network such as network 108 of FIG. 1. For example, a request from app 202 to access a file stored remotely in various embodiments may result in file system client 208 making a remote call, via network communication interface 212, for example to a file system metadata server such as server 110 of FIG. 1.

In various embodiments, file system client 208 may be configured to store in a metadata write buffer comprising or otherwise associated with file system client 208 and/or cache 210 one or more file system operations and/or requests affecting file system metadata comprising a portion of the file system metadata with respect to which a file system metadata write lease is held by file system client 208. For example, file system operations affecting metadata may be buffered as received, e.g., as a result of local file system calls by applications such as application 202 of FIG. 2, and may be communicated to the remote file system metadata server asynchronously and/or upon occurrence of an event, e.g., receipt of an indication that a metadata write lease "break" event has been received and/or has occurred. For example, a second client system may indicate a desire and need to perform operations affecting a portion of the file system metadata with respect to which a first client system holds a lease, result in a "break" communication being sent to the first client system, which in turns "flushes" at least those operations in the buffer that affect the portion of metadata with respect to which the lease had been held.

Figure 3:
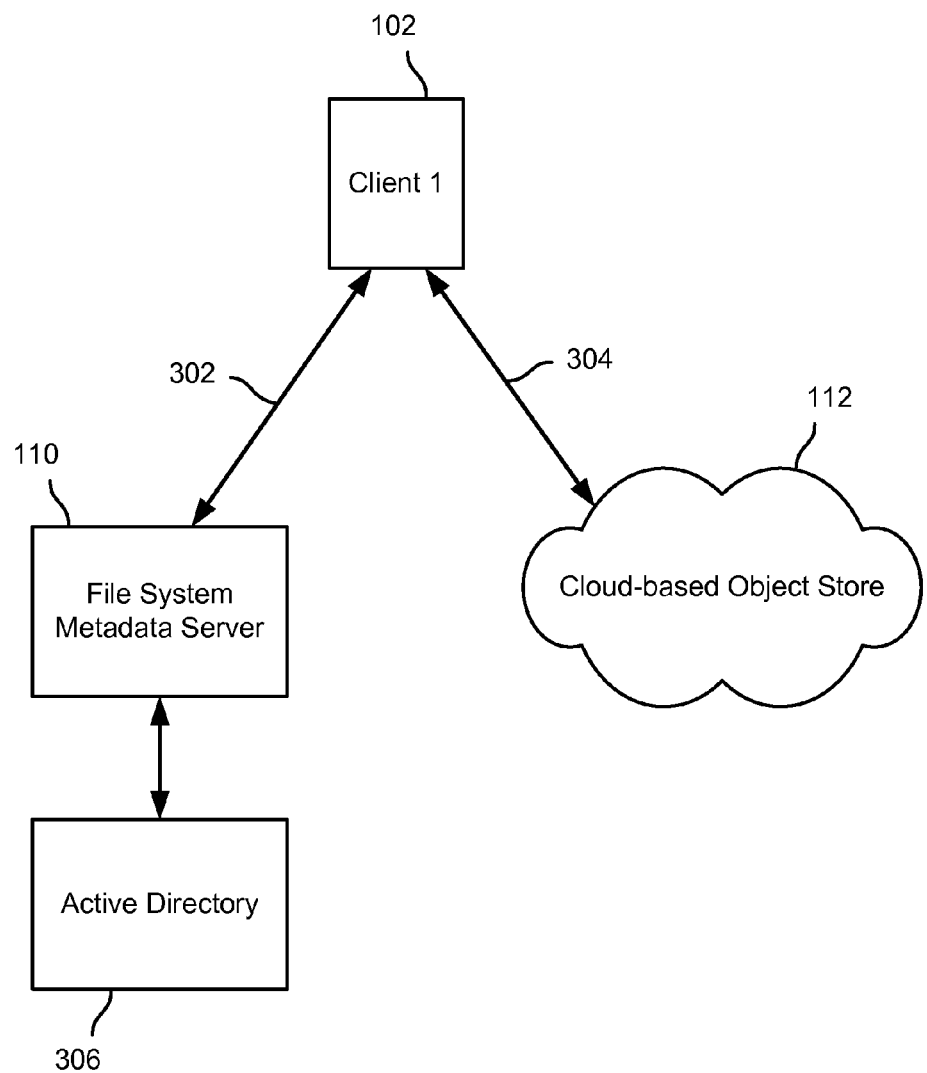
FIG. 3 is a block diagram illustrating an embodiment of a distributed file system.

FIG. 3 is a block diagram illustrating an embodiment of a distributed file system. In the example shown, client 102 communicates via a secure session-based connection 302 with file system metadata server 110. In addition, client 102 communicates with cloud-based object store 112 via a TCP/IP or other connection that enables client 102 to store objects (e.g., file segments or "chunks") via HTTP "PUT" requests and to retrieve segments ("chunks") via HTTP "GET" requests. In various embodiments, client 102 (e.g., a file system client or other agent running on client 102) sends and receives distributed file system "control plane" communications via secure connection 302 (e.g., file system operations that change or require the processing and/or use of file system metadata), whereas communicates sent via connection 304 may be considered to comprising a "data plane" via which file system object data (i.e., segments or "chunks") may be stored and/or retrieved. In the example shown, file system metadata server 110 has access to active directory 306, which in various embodiments may comprise information usable to authenticate users of clients such as client 102.

In various embodiments, file system objects, such as files, may be stored by a client on which a distribute file system client or other agent has been installed. Upon receiving a request to store (or modify) a file system object, in various embodiments the file system client segments the object into one or more segments or "chunks" and computes a reference (e.g., a hash) for each. The references are included in a file system request sent to the file system metadata server, e.g., via a secure connection such as connection 302 of FIG. 3. The file system metadata server returns information to be used by the file system client to store (non-duplicate) segments/chunks in the cloud-based object store by sending the segment data directly to the cloud-based object store, e.g., via PUT requests sent via a connection such as connection 304 of FIG. 3.

Figure 4:
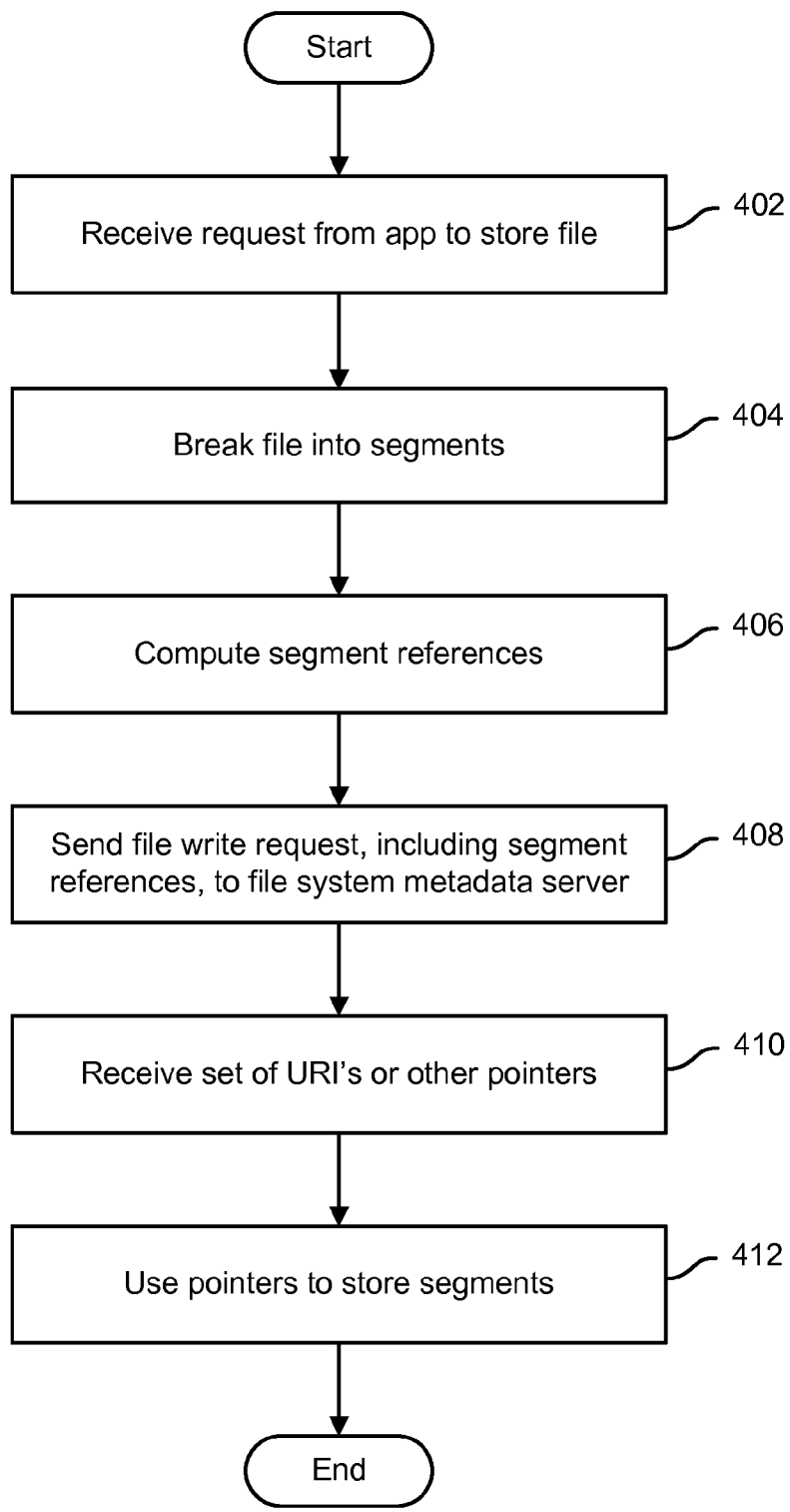
FIG. 4 is a flow chart illustrating an embodiment of a process to store a file or other file system object in a distributed file system.

FIG. 4 is a flow chart illustrating an embodiment of a process to store a file or other file system object in a distributed file system. In various embodiments, the process of FIG. 4 may be performed on a client system or device, e.g., by a file system client or other agent running on the client system/device, such as file system client 208 of FIG. 2. In the example shown, a request is received, e.g., from an application, to store a file (402). The file is segmented into one or more segments (404). For each segment, a segment reference, e.g., a hash, is computed (406). A file write request that includes the segment references is sent to the file system metadata server (408). A set of uniform resource indicators (URI's) or other pointers is received from the file system metadata server (410). In various embodiments, the set of pointers may include pointers only for those segments not already stored by the distributed file system. The received pointers are used to store segments, e.g., via HTTP "PUT" requests sent directly to the cloud-based object store (412).

Figure 5:
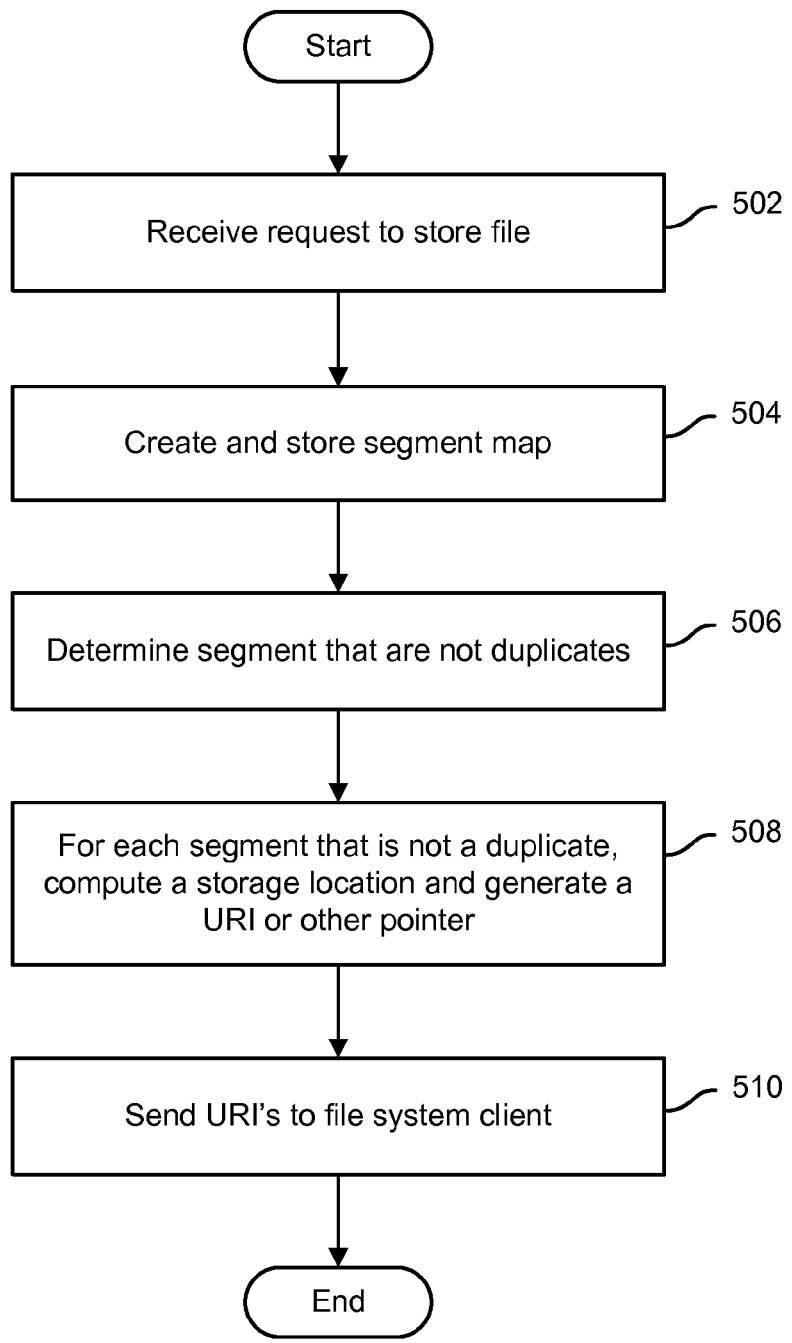
FIG. 5 is a flow chart illustrating an embodiment of a process to handle a request to store a file or other file system object in a distributed file system.

FIG. 5 is a flow chart illustrating an embodiment of a process to handle a request to store a file or other file system object in a distributed file system. In various embodiments, the process of FIG. 5 may be performed by a file system metadata server, such as file system metadata server 110 of FIG. 1. In the example shown, a request to store a file is received (502). A segment ("chunk") map that associates the file system object name and/or other identifier (e.g., file name, pathname) with a set of one or more segment references (e.g., hash values) is created (504). Segments that are not duplicates of segments already stored by the distributed file system are identified, for example based on the segment references (506). For each segment that is not a duplicate, a storage location is computed (e.g., based at least in part on all or part of the segment reference) and a URI or other pointer usable to store the segment directly in the cloud-based data store is generated (508). In various embodiments, the URI or other pointer is signed cryptographically by the file system metadata server. The URI may have an expiration time by which it must be used to store the segment. The URI's are sent to the file system client from which the request to store the file was received (510).

Figure 6:
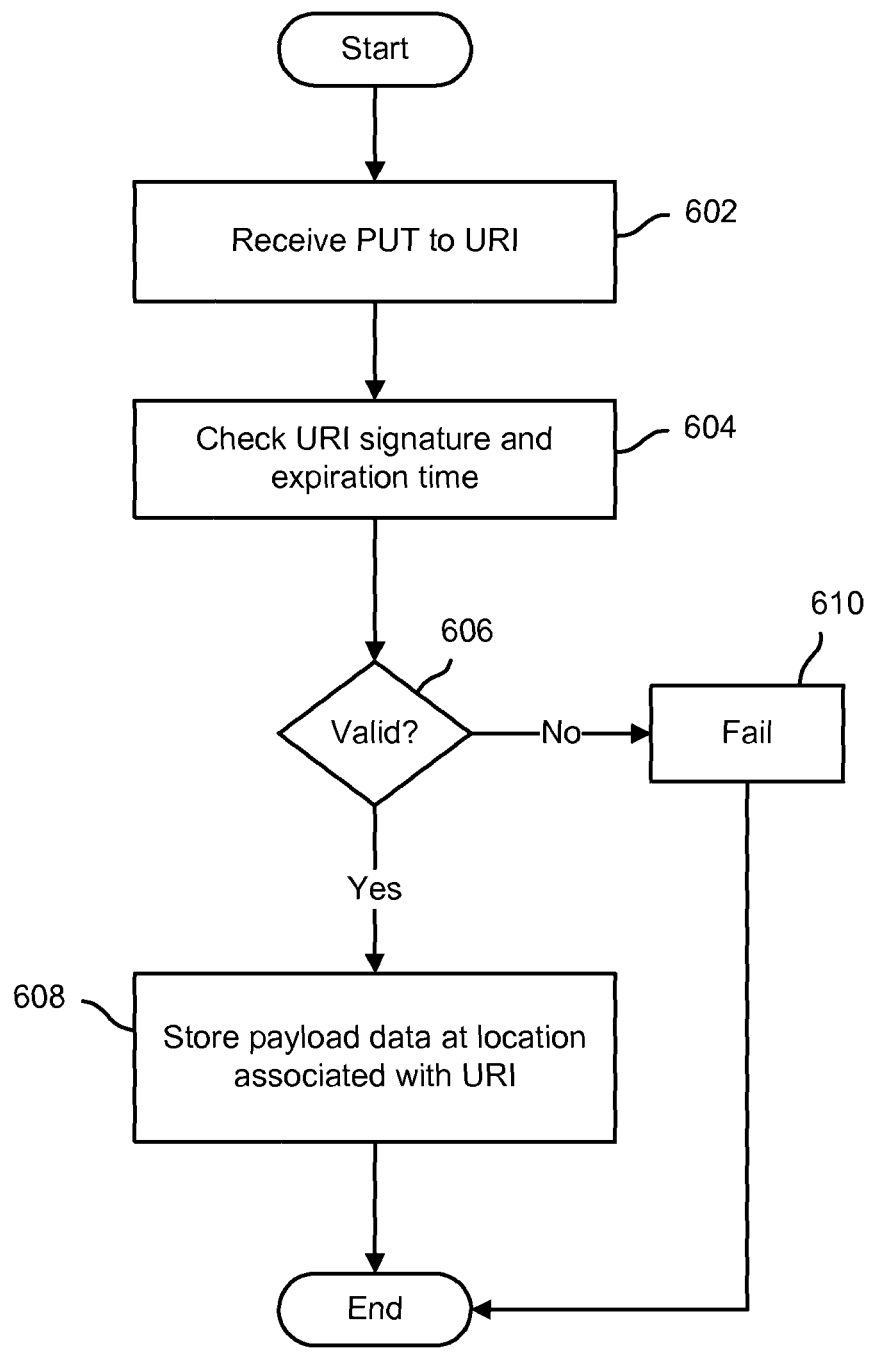
FIG. 6 is a flow chart illustrating an embodiment of a process to store file segment or "chunk" data associated with a distributed file system.

FIG. 6 is a flow chart illustrating an embodiment of a process to store file segment or "chunk" data associated with a distributed file system. In various embodiments, the process of FIG. 6 may be performed by a cloud-based object store, such as object store 112 of FIG. 1. In the example shown, a "PUT" request associated with a URI specified in the request is received (602). A cryptographic signature associated with the URI and an expiration time encoded in the URI are checked (604). For example, the cloud-based object store may be provisioned to check that the URI has been signed by a trusted file system metadata server and/or that an expiration time of the URI has not elapsed. If the URI is determined to be currently valid (606), a payload data associated with the PUT request, e.g., file system object segment or "chunk" data, is stored in a location associated with the URI (608). If the URI is determined to not be valid (606), the PUT request fails (610), and the file system client receives a response indicating it must obtain a new URI from the file system metadata server.

In various embodiments, file system objects, such as files, may be retrieved by a client on which a distribute file system client or other agent has been installed. Upon receiving a request to access a file system object, in various embodiments the file system client sends a file access request to the file system metadata server, e.g., via a secure connection such as connection 302 of FIG. 3. The file system metadata server returns information (e.g., one or more URI's or other pointers) to be used by the file system client to retrieve segments/chunks directly from the cloud-based object store, e.g., via GET requests sent via a connection such as connection 304 of FIG. 3.

Figure 7:
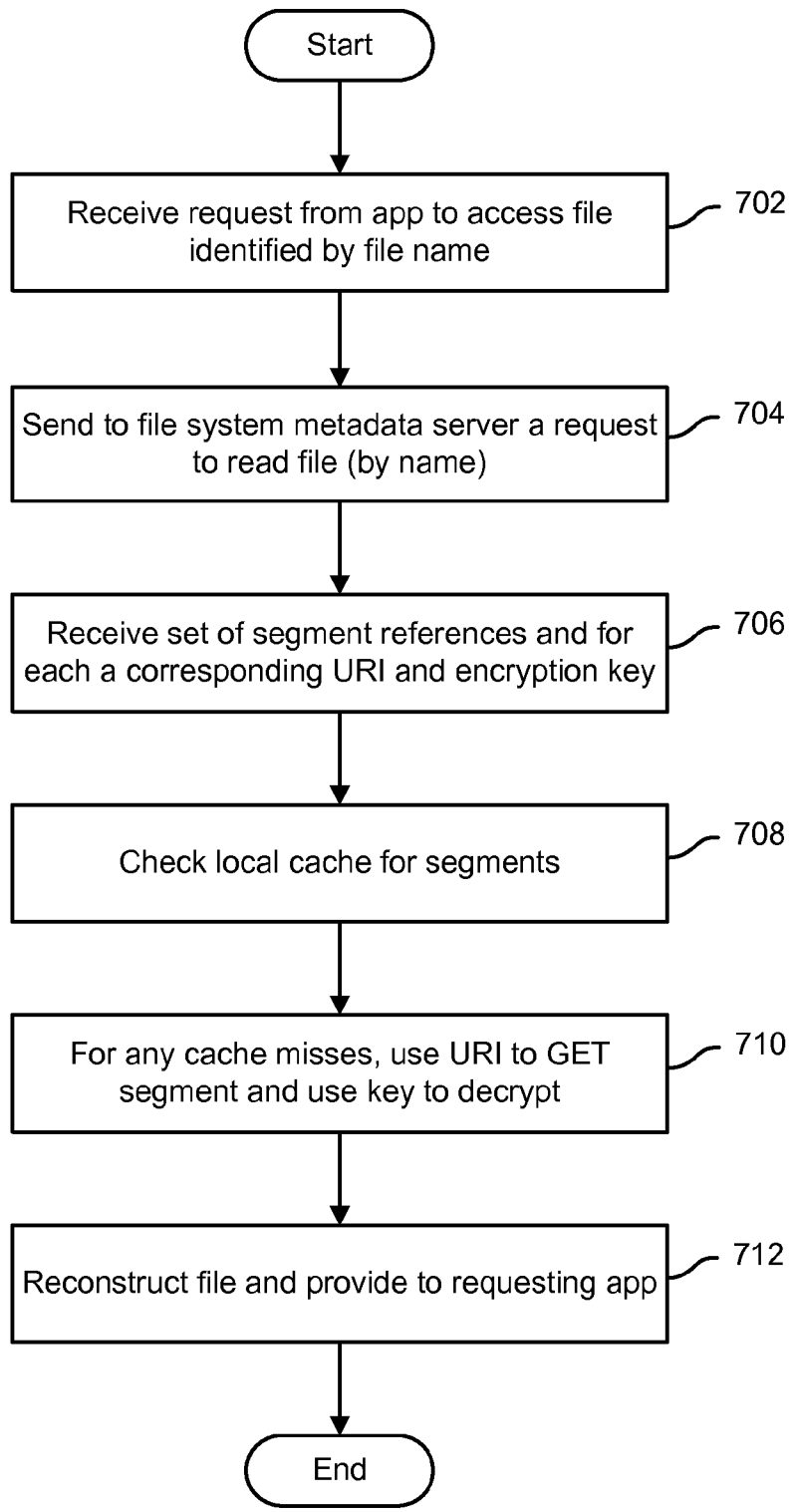
FIG. 7 is a flow chart illustrating an embodiment of a process to access a file or other file system object stored in a distributed file system.

FIG. 7 is a flow chart illustrating an embodiment of a process to access a file or other file system object stored in a distributed file system. In various embodiments, the process of FIG. 4 may be performed on a client system or device, e.g., by a file system client or other agent running on the client system/device, such as file system client 208 of FIG. 2. In the example shown, a request to access a file system object, e.g. a file identified by file name, is received from an application (702). A request is sent to a file system metadata server to retrieve the file (704). A set of segment references, and for each a corresponding URI and encryption key, is received from the file system metadata server (706). A local cache is checked to determine whether any required segments are present in the cache (708). For all segments not present in the cache, the associated URI is used to send a GET request to retrieve the segment from the cloud-based object store, and the associated key is used to decrypt the segment once it has been received from the object store in encrypted form (710). The segments are used to reconstruct the file and provide access to the file to the application from which the access request was received (712).

Figure 8:
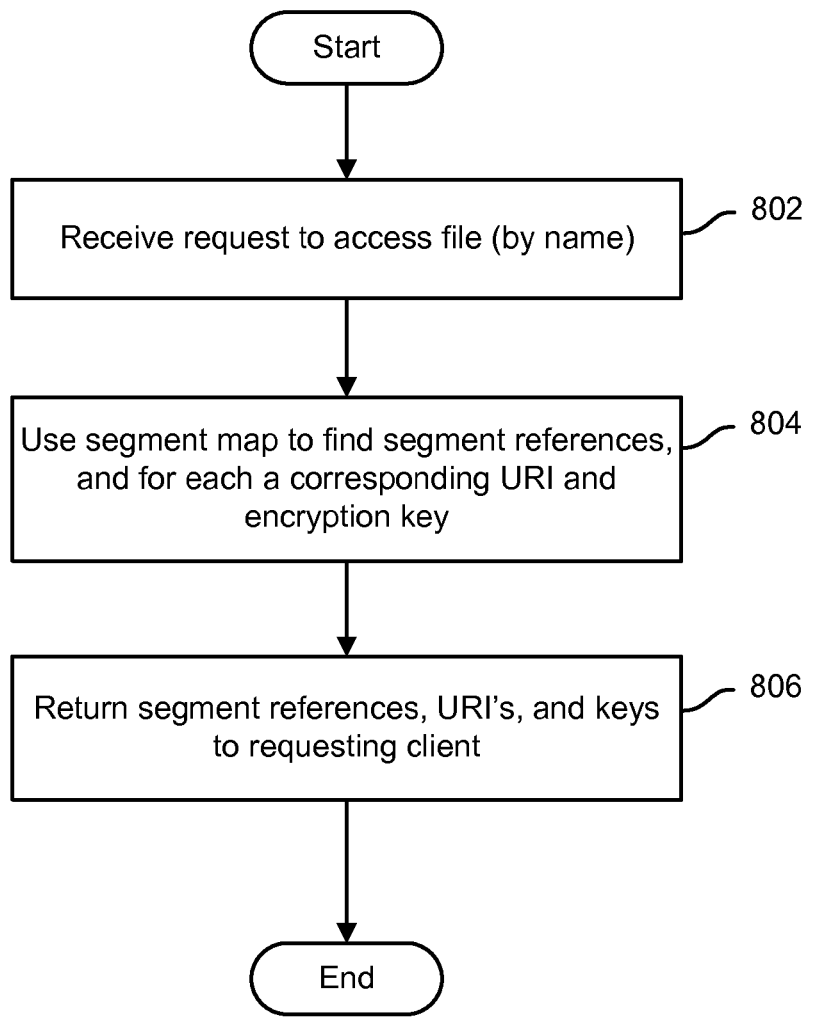
FIG. 8 is a flow chart illustrating an embodiment of a process to handle a request to access a file or other file system object stored in a distributed file system.

FIG. 8 is a flow chart illustrating an embodiment of a process to handle a request to access a file or other file system object stored in a distributed file system. In various embodiments, the process of FIG. 5 may be performed by a file system metadata server, such as file system metadata server 110 of FIG. 1. In the example shown, a request to access a named file is received (802). A segment map associated with the file is retrieved and used to determine a set of segment references (e.g., hashes), and for each a corresponding URI indicating where the segment is stored in the cloud-based segment store and an encryption key usable to decrypt the segment (804). The segment references, URI's, and keys are returned to the file system client from which the file access request was received (806).

Figure 9:
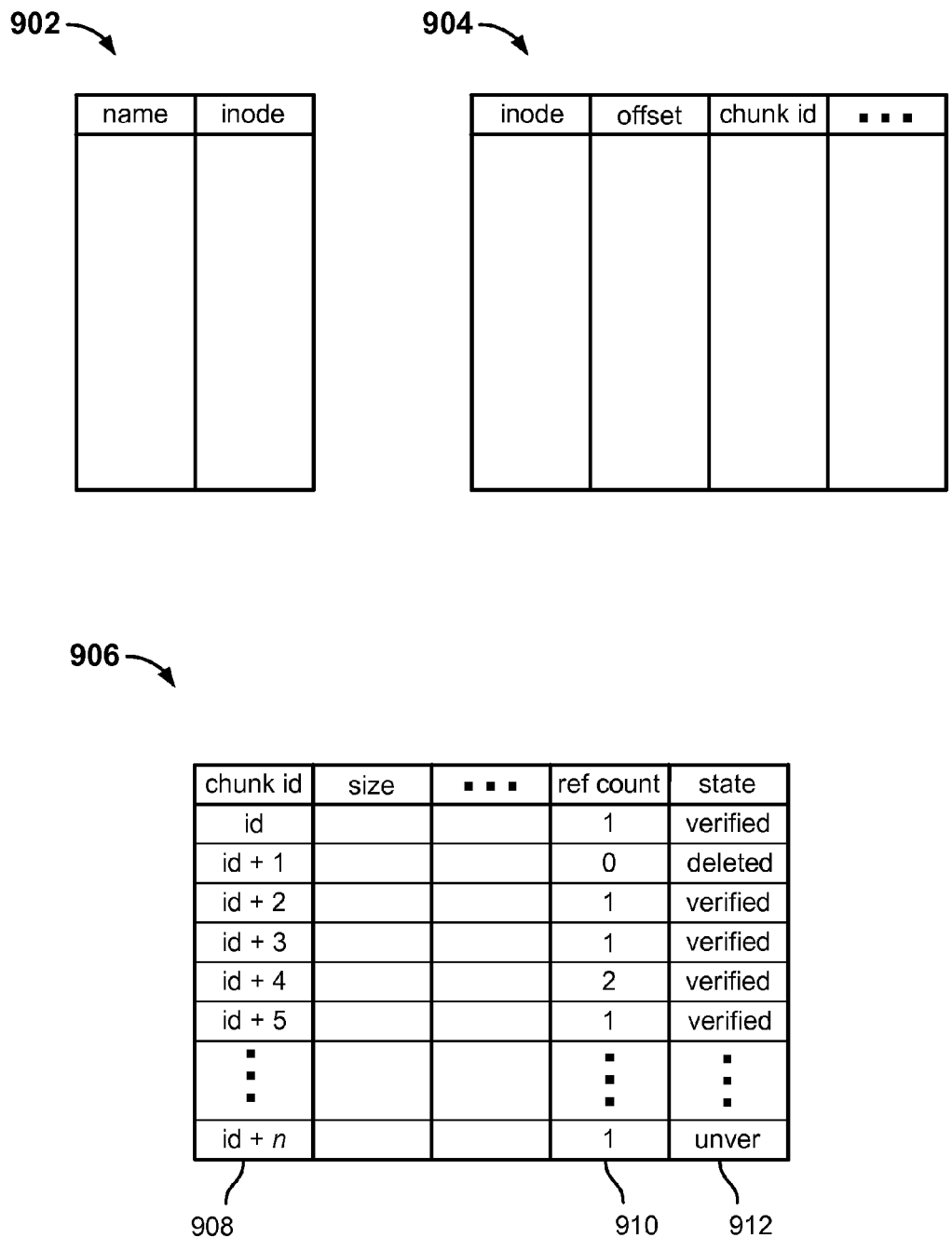
FIG. 9 is a block diagram illustrating an example set of file system metadata tables used in an embodiment of a distributed file system.

FIG. 9 is a block diagram illustrating an example set of file system metadata tables used in an embodiment of a distributed file system. In various embodiments, the tables 902, 904, and 906 of FIG. 9 may be created and maintained by a file system metadata server, such as file system metadata server 110 of FIGS. 1 and 3. In the example shown, an inode table 902 is used to store data associating each named file system object, e.g., directories, files, or other objects, with a corresponding inode or other unique number or identifier. Chunk map table 904 is used in various embodiments to store for each file, and for each of one or more segments (chunks) into which that file has been broken up to be stored, an offset of the chunk within the file, a chunk identifier (chunk id), and other metadata. For example, a file that has been stored as three chunks would have three entries (rows) in table 904, one for each chunk. In various embodiments, the chunk id is a monotonically increasing value, with each successively stored chunk being given a next chunk id in alphanumeric order. In various embodiments, chunks are immutable once stored. If file data is modified, affected data is stored as a new chunk and assigned a next chunk id in order. As a result, a chunk with a higher chunk id by definition was stored subsequent to a chunk with a lower chunk id, and it can be assumed neither was modified since it was created and stored.

Referring further to FIG. 9, the chunk metadata table 906 includes a row for each chunk, identified by chunk id (column 908 in the example shown), and for each chunk metadata indicating the size of the chunk; other metadata; a reference count (column 910) indicating how many currently live files (or other file system objects) reference the chunk; and metadata indicating a state of the chunk, i.e., whether it has been verified or deleted (column 912).

In various embodiments, when a chunk is first stored the chunk is considered to be initially in an "unverified" state, and metadata reflecting the unverified state of the chunk may be stored initially in column 912 of table 906. Verification may be performed by the file system metadata server and may include reading the chunk as stored in the cloud-based object store, verifying that the chunk data corresponds to what the file system expects (e.g., computing a hash of the chunk as read by the server and comparing the hash to a previously-stored hash of the chunk, e.g., one received from the file system client that stored the chunk), and updating the state metadata 912 in table 906 to reflect a "verified" state for the chunk once it has been verified.

A de-duplicating distributed file system that segments files in chunks of a first size for purposes of de-duplication but stores file data in much larger objects to take advantage of the performance characteristics of typical cloud-based object stores is disclosed. In various embodiments, a file system client running on a client device segments a file to be stored into "chunks" of a first size. Data representing the chunks, such as hashes or other representations of the respective chunks, is sent to a remote file system metadata server. The server performs de-duplication processing to determine which, if any, of the chunks may already be stored by the file system. For those chunks that have not yet been stored by the file system, the server responds to the client with instructions to combine a plurality of chunks in a combined object and to store the combined object, e.g., via an HTTP PUT or other request, in a cloud-based object store at a location specified by the server, e.g., using a uniform resource indicator (URI) or other locator provided by the server.

Figure 10:
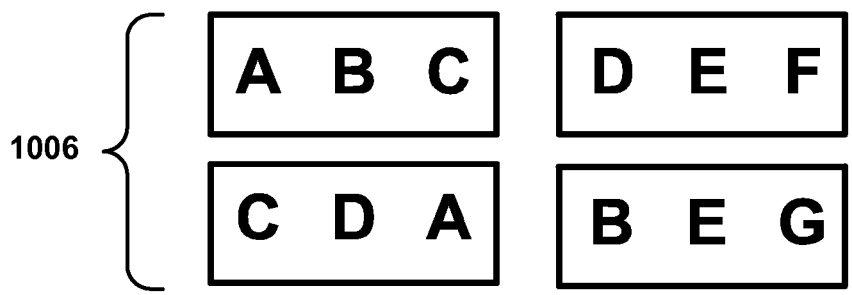
FIG. 10 is a block diagram illustrating an example of file segmentation at different levels of granularity in an embodiment of a distribute file system.
Figure 10:
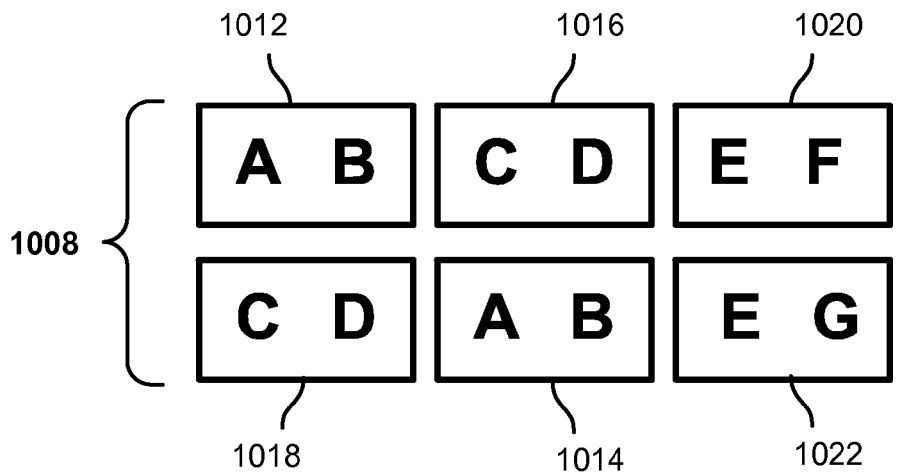

FIG. 10 is a block diagram illustrating an example of file segmentation at different levels of granularity in an embodiment of a distribute file system. In the example shown, a first file 1002 includes the data shown, in this example the data "A B C D E F". A second file 1004, stored subsequent to the first file being stored, includes the data "C D A B E G", with the capitals letters in the respective files 1002 and 1004 representing in each file the same sequence of bytes of data, e.g., "A" at the beginning of first file 1002 is the same data as the data represented by the same capital letter "A" in the second file 1004

In FIG. 10, two possible segment or "chunk" sizes that could be used, for purposes of de-duplication, for example, are shown. In the first example, chunks 1006 each of a size corresponding to three of the capital letters representing data comprising the files 1002 and 1004, respectively, are shown. In this example, segmenting the files 1002 and 1004 into chunks 1006 of the size shown would result in no duplicate chunks being found as between the first file 1002 and the second file 1004. By comparison, a set of chunks 1008 created by segmenting the files 1002 and 1004 at a finer granularity (i.e., smaller chunk size) would result in significantly improved de-duplication. In this example, a chunk 1014 of file 1004 would be determined to be a duplicate of previously-stored chunk 1012 of file 1002, and chunk 1018 of file 1004 would be determined to be a duplicate of previously-stored chunk 1016 of file 1002. In this example, chunk 1022 of file 1004 would not be determined to be a duplicate of any previously-stored chunk of file 1002, in this case due to difference between chunk 1022 of file 1004 and chunk 1020 of file 1002 (and the other chunks of file 1002). In the example shown, an even further degree of de-duplication could be achieved by segmenting the files into chunks of a size corresponding to individual capital letters as represented in FIG. 10, because if chunks of that size were used only the chunk corresponding to capital letter "G" if file 1004 would be found to not be a duplicate of any chunk in file 1002.

The example in FIG. 10 illustrates that in general chunks of a smaller size may yield higher de-duplication benefits than chunks of a larger size. However, if chunks that are too small are used, the overhead associated with computing and storing hashes of chunk data to detect duplicates, etc., may become too costly. Therefore, typically a balance is struck between achieving more benefit of de-duplication through relatively smaller chunk size, and the overhead associated with processing the chunks.

In various embodiments of a distributed file, a further consideration is the efficiency of storing chunks in a cloud-based object stored, such as cloud-based object store 112 of FIG. 1. Typically, such cloud-based object stores are optimized to store objects that are very large relative to the chunk size that may be optimal for purposes of de-duplication and related overhead. For example, for a typical cloud-based object store, the latency and other overhead associated with storing an object may increase linearly with size up to a certain size, but then level off for objects beyond a certain size, e.g., a size that is relatively large compared to a chunk size that may be optimal for other purposes, such as de-duplication. To take advantage of this characteristic, in various embodiments or a distribute file system as disclosed herein files are segmented for purposes of file system operations into a chunk size that is advantageous for purposes of de-duplication and/or other file system processing, but file data is stored in cloud-based object store(s) such as object store 112 of FIG. 1 in objects (sometimes referred to herein as "blobs", to distinguish them clearly from "files" or "chunks") that are relatively much larger in size than the chunk size. In various embodiments, a file system client may be configured and/or instructed to combine chunks into a larger combined object, and then to store the combined object (or "blob") in a cloud-based object store.

Figure 11:
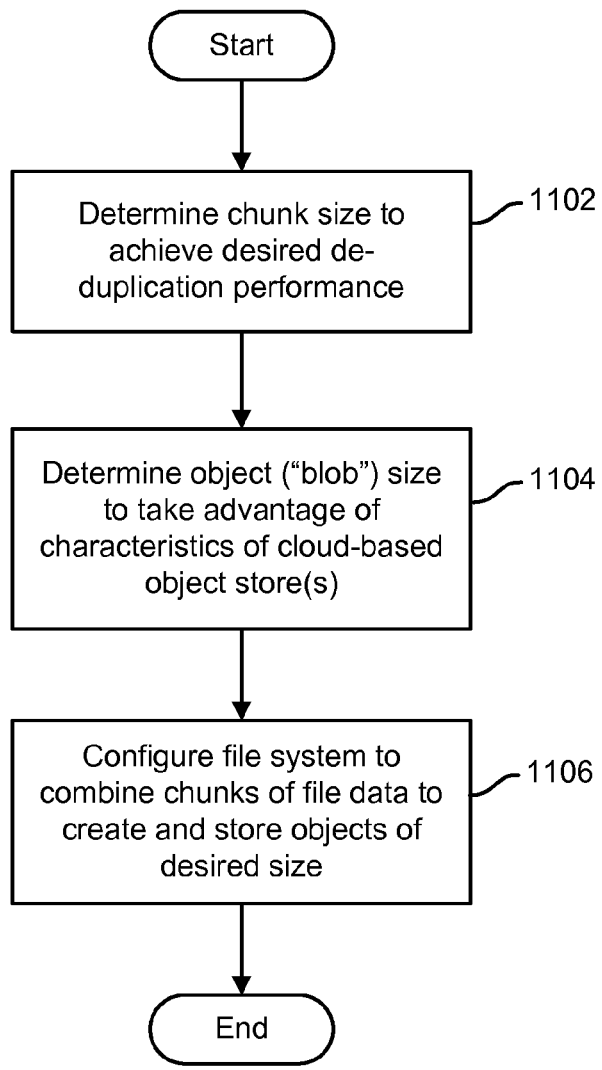
FIG. 11 is a flow chart illustrating an embodiment of a process to configure a distributed file system to store file data.

FIG. 11 is a flow chart illustrating an embodiment of a process to configure a distributed file system to store file data. In various embodiments, the process of FIG. 11 may be used to develop and configure distributed file system components, such as file system client 208 of FIG. 2 and file system metadata server 104 of FIGS. 1 and/or 6. In the example shown, a chunk size to achieve a desired performance with respect to de-duplication and/or one or more other file system objectives is determined (1102). In various embodiments, the determination may be made in whole or in part based on domain knowledge, static analysis of all or part of a set of files, observed de-duplication performance in test performed using chunks of different sizes, etc. An object or "blob" size to be used to store file system data in a manner that takes advantage of object size-related characteristics of a cloud-based or other object store is determined (1104). For example, a performance graph or other representation of object store performance and/or costs (e.g., latency, overhead) by object size may be generated and used to select an object ("blob") size that achieves a desired level of performance by the object store. The distribute file system is configured to segment files into chunks of the determined chunk size for purposes of file system operations (e.g., de-duplication), and to combine multiple chunks into larger objects ("blobs") of the determined object size (1106) for storage in a cloud-based object store.

In some embodiments, the number of chunks that may be combined to former a larger object ("blob") to be stored in a cloud-based object store may be variable. For example, the number of chunks may vary based on the size of a file or set of files being stored. In some embodiments, the file system client may be configured to determine the number of chunks to be combined to form a larger object to be stored in a cloud-based object store. In some embodiments, the determination as to the number of chunks to be combined and/or which chunks are to be included in which object ("blob") may be made at a file system server, such as file system metadata server 104 of FIGS. 1 and/or 6. In some embodiments, the file system client may be configured to receive an indication from the server as which chunks are to be combined in which object, and to create and store objects based on such instructions.

In some embodiments, chunks associated with two or more different files may be included in a same object to be stored in a cloud-based object store. In some embodiments, chunks associated with files associated with two or more different file system clients may be included in an object as stored in a cloud-based object store. For example, in some embodiments, de-duplication may be performed across file system clients, which in some circumstance may result in one or more chunks comprising a stored object ("blob") being referenced by files associated with different file system clients.

Figure 12:
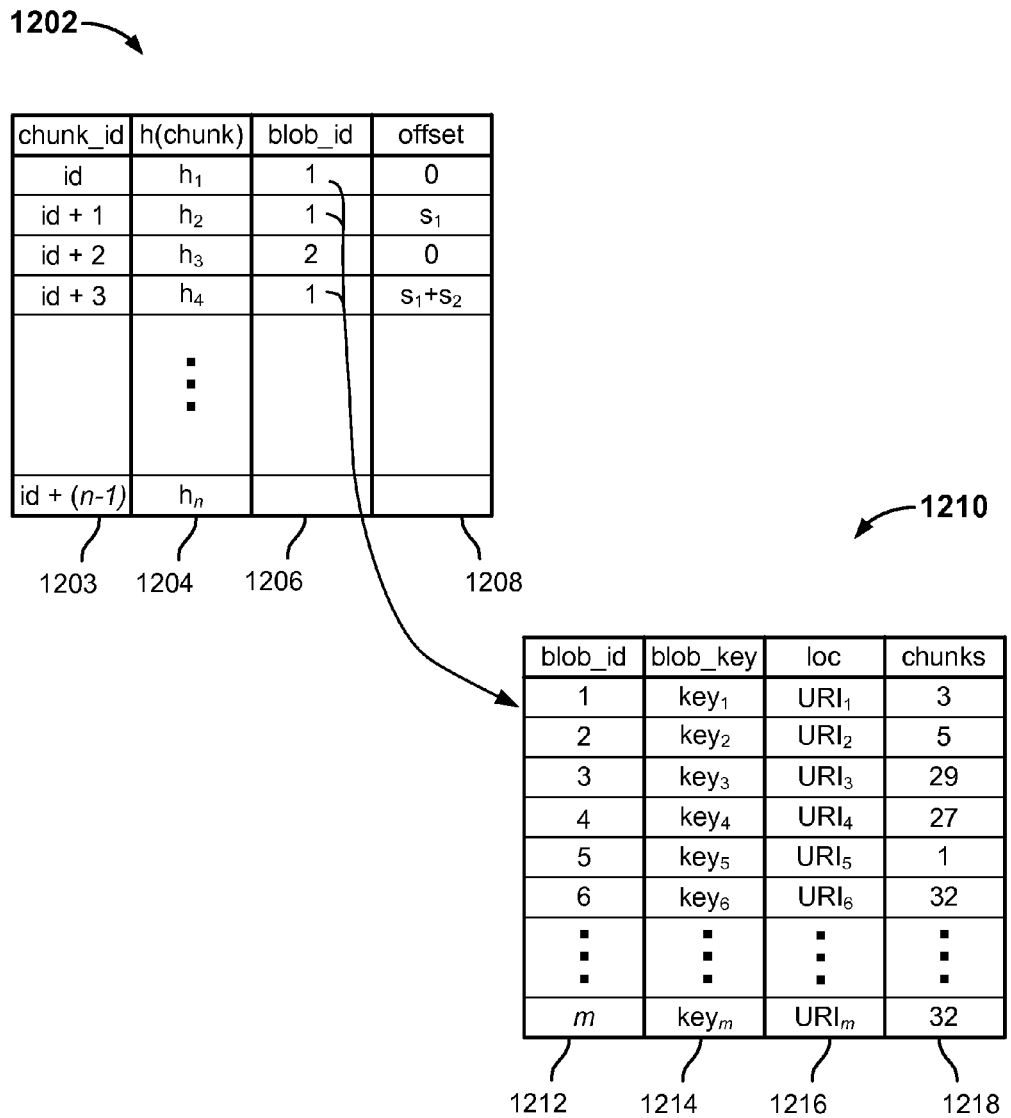
FIG. 12 is a block diagram illustrating an example of metadata tables used to store file data in an embodiment of a distributed file system.

FIG. 12 is a block diagram illustrating an example of metadata tables used to store file data in an embodiment of a distributed file system. In various embodiments, metadata tables such as tables 1202 and 1210 of FIG. 12 may be created and maintained by a distributed file system metadata server, such as file system metadata server 104 of FIGS. 1 and/or 6. In the example shown, a chunk metadata table 1202 includes a chunk identifier column 1203 in which a monotonically increasing chunk identifier is stored; a chunk hash column 1204 in which for each chunk a corresponding hash computed based on all or part of the chunk's data is stored. For each chunk, a "blob id" that identifies a larger stored object ("blob") in which the chunk data was included is listed in a "blob_id" column 1206. A location of each chunk within the corresponding stored object ("blob") within which it is included is listed in an "offset" column 1208. For a given chunk, then, table 1202 may be used to find the stored object within which the chunk's data is included as stored, e.g., in a cloud-based object store, and an offset within that object indicating where the chunk's data is located within the object's data.

As indicated by the arrow shown between the blob id value of "1" in the first, second, and fourth rows of table 1202 to the entry (row) associated with the same blob id "1" in blob metadata table 1210, the blob id as stored in chunk metadata hash table 1202 for a given chunk hash value may be used to locate in blob metadata table 1210 a corresponding entry (see blob id column 1212) that includes blob metadata such as an encryption key or other secret data used to encrypted data comprising the blob (blob encryption key column 1214), a location in which the blob is stored, e.g., in a cloud-based object store (URI column 1216), and an indication of a number of chunks associated with file system objects that are currently live and/or otherwise subject to being retained (chunks referencing count column 1218). As to the latter column, for example, in the entry (row) for blob_id =1, the corresponding value in chunks referencing count column 1218 indicates that 3 chunks that are currently live (or otherwise subject to being retained, e.g., by virtue of being associated with a snapshot that remains stored) reference that blob. In various embodiments, as described more fully below in connection with FIG. 15, the chunks referencing count column may be used to determine when a blob comprising a plurality of chunks may be subject to being deleted, e.g., from a cloud-based object store in which the blob is stored.

In various embodiments, verification of file system data stored as disclosed herein is performed by the file system, e.g., by a file system metadata server, such as file system metadata server 104 of FIGS. 1 and/or 6. In various embodiments, verification enables a guarantee of corruption-free de-duplicated storage of file system objects to be provided across clients, even in the presence of misconfigured and/or malfunctioning (e.g., "buggy") or malicious clients.

In some embodiments, a stored object ("blob") comprising a plurality of chunks for file data is retrieved from a cloud-based object store. The retrieved object may be stored locally, e.g., in a cache, and used to verify component chunks comprising the object. Various techniques may be used to determine how long a cached copy of a given object ("blob") should remain in the cache to facilitate verification.

In various embodiments, individual chunks within a larger stored object ("blob") are encrypted, each using an encryption key associated with that chunk and not with one or more other chunks in the same stored object. In various embodiments, this approach enables access to be controlled on a chunk by chunk basis, by providing to a file system client that needs and is authorized to have access to only a subset of chunks included in a larger stored object only the encryption keys associate with the subset of chunks.

Figure 13:
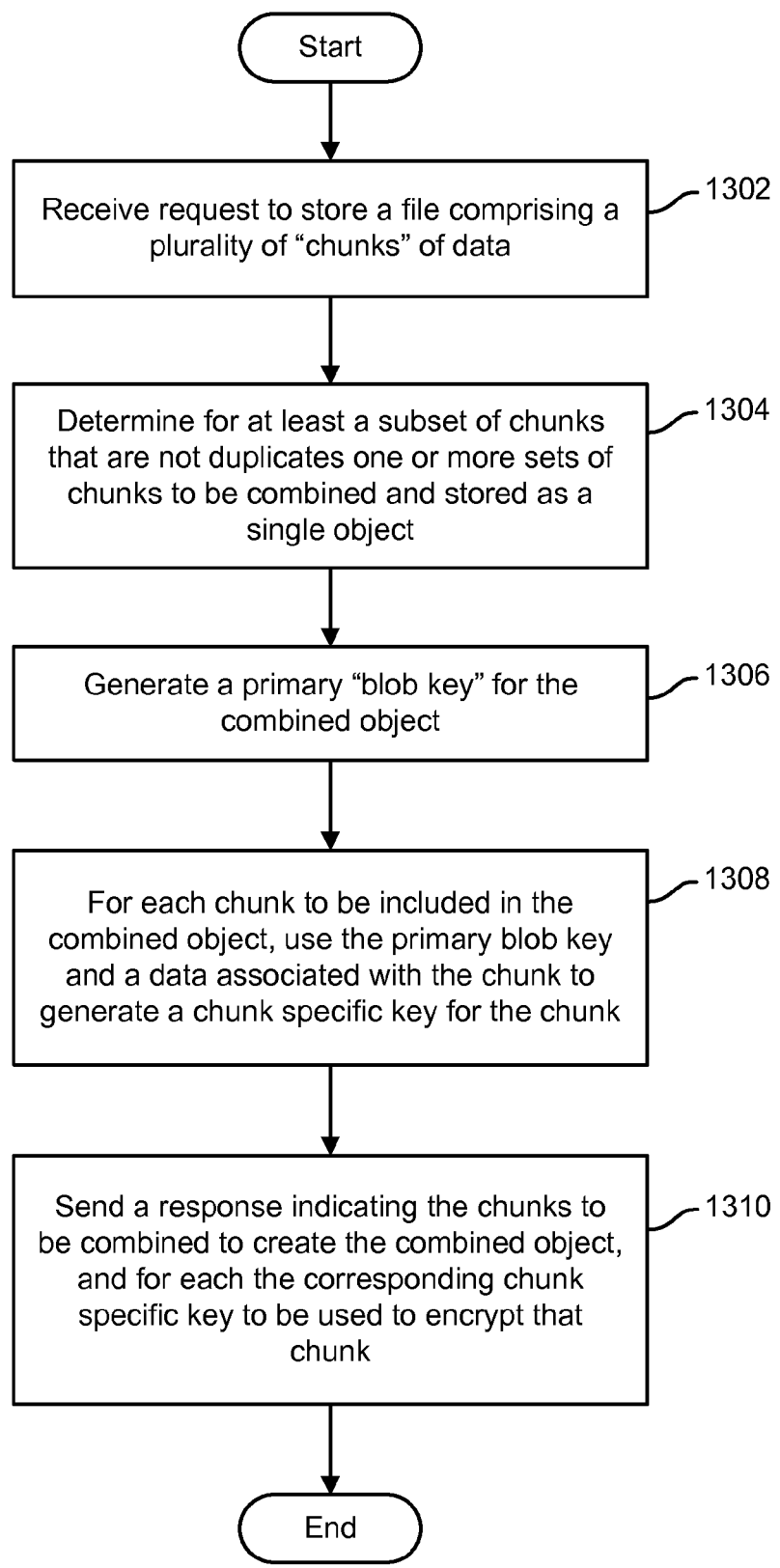
FIG. 13 is a flow chart illustrating an embodiment of a process to store a file in a distributed file system.

FIG. 13 is a flow chart illustrating an embodiment of a process to store a file in a distributed file system. In various embodiments, the process of FIG. 13 may be performed by a file system metadata server, such as file system metadata server 110 of FIG. 1. In the example shown, a request to store a file comprising a plurality of chunks of data is received (1302). For example, a request may be received from a file system client to store a file comprising a plurality of chunks identified in the request, such as by including for each chunk a corresponding chunk hash or other data comprising, derived from, and/or otherwise representative of the chunk. It is determined with respect to at least a subset of the chunks that they are not duplicates of other chunks already stored by the file system, and at least a subset of chunks that are not duplicates are identified to be included in a single larger stored object for purposes of being stored by the file system client in a cloud-based object store associated with the file system (1304). A primary key to be used to encrypt data comprising the stored object in which the chunks are to be included, sometimes referred to as a "blob" key, is generated (1306). In some embodiments, the blob key is a monotonically increasing value. In some embodiments, the key may be generated automatically, e.g., by the database. In some embodiments, the keys may be generated and/or managed by a file system process and/or associated application. In various embodiments, the blob key is computed based at least in part on data comprising the plurality of chunks to be included in blob, e.g., a hash of all or part of the blob data, a hash or other value generated based on the chunk hashes included in the request, etc. In some embodiments, the blob key is stored at the file system metadata server and is not share with the file system client (s).

Referring further to FIG. 13, for each chunk to be included in the larger stored object ("blob"), the blob key is used, e.g., at the file system metadata server, to compute an encryption key that is derived from the blob key and is associated with that chunk (1308). In various embodiments, the chunk-specific key may be computed based at least in part on the blob key and the chunk hash of that chunk. In some embodiments, the blob key is stored at the file system metadata server, but the individual chunk keys are not. Instead, when the chunk keys are needed, e.g., to decrypt chunk data at the server to perform verification of the chunk as stored or to be provided to a file system client to enable the client to decrypt the chunk data, the stored blob key and the chunk data used to generate the key, e.g., the chunk hash, are used to re-compute the chunk key.

A response (e.g., to the request to store the file) indicating the chunks to be included in the larger stored object and for each the corresponding chunk key to be used to encrypt that chunk are sent to the file system client from which the request was received (1310). In various embodiments, the file system client is configured to process the response, including by using the chunk key associated with each respective chunk to encrypt that chunk, and to combine the individually encrypted chunks as indicated in the response to form the larger object ("blob") and stored it in the cloud-based object store, e.g., using a URI or other locator included in the response.

Figure 14:
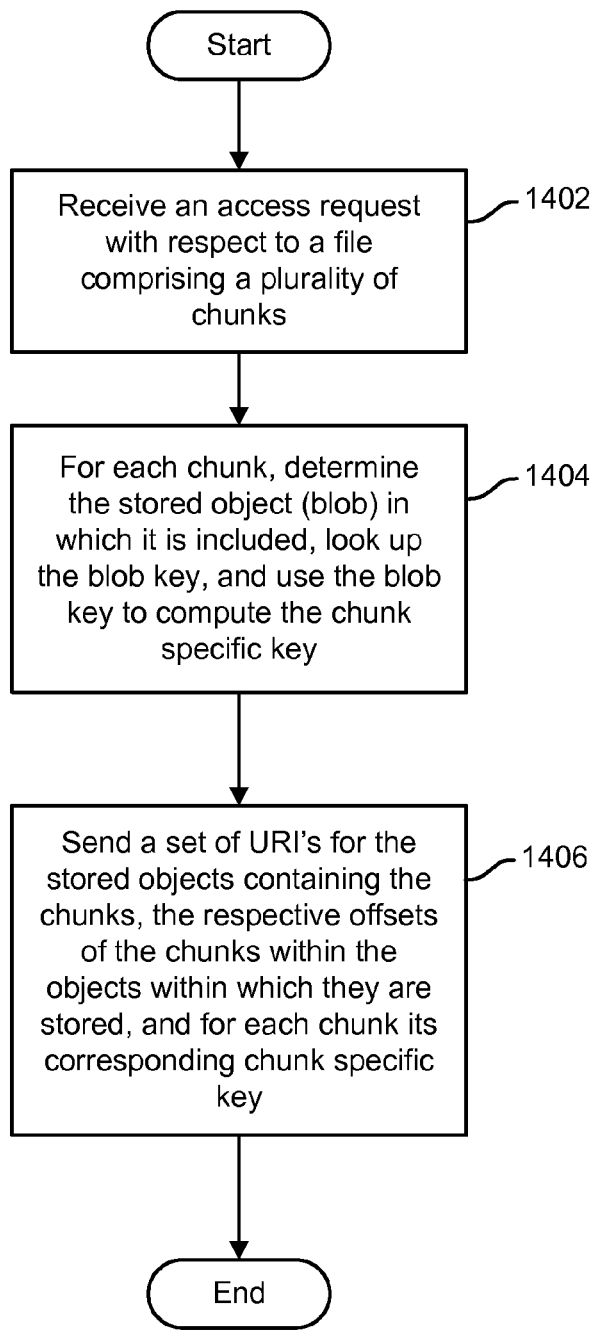
FIG. 14 is a flow chart illustrating an embodiment of a process to provide access to a file stored in a distributed file system.

FIG. 14 is a flow chart illustrating an embodiment of a process to provide access to a file stored in a distributed file system. In various embodiments, the process of FIG. 14 may be performed by a file system metadata server, such as file system metadata server 110 of FIG. 1. In the example shown, a request to access a file comprising a plurality of chunks is received (1402), e.g., from a file system client. For example, a request to access a file identified in the request by file name and/or path may be received, and file system metadata tables 902 and 904 may be used to identify a plurality of chunks comprising the file. For each chunk, a corresponding larger stored object ("blob") in which the chunk is included is determined (e.g., using a table such as table 1202 of FIG. 12), and for each blob containing one or more chunks associated with the file a corresponding blob key is retrieved (e.g., using a table such as table 1210 of FIG. 12) and used along with the respective chunk hashes (or other chunk data and/or metadata) to compute a corresponding chunk key (1404). A set of URI's for blobs corresponding to the chunks required to reconstruct the file, the blob offset of each chunk within its respective blob, and the chunk keys required to decrypt the data comprising each chunk as stored in its respective blob are sent to the file system client from which the access request was received (1406). In various embodiments, the file system client is configured to use the URI(s) to retrieve the required blob(s) from the cloud-based object store on which each is stored;

to use the respective offsets to find the chunk data within the blob(s); and to use each the chunk key corresponding to each chunk to decrypt the stored data comprising that chunk. The file system client uses the decrypted chunk data to reconstruct the file and make it available for use at the client system, e.g., by an application such as application 202 of FIG. 2. In various embodiments, a chunk key can be derived from the blob master key, but a chunk key cannot be used to derive the blob master key. Therefore, sending a chunk key to a file system client does not enable the client the derive the blob master key and therefore does not enable the client to derive the chunk key for chunks in a blob other than those chunks to which that client is authorized to have access and for which the client has been given the corresponding chunk key.

In some alternative embodiments, all chunks in a blob may be encrypted using a single key. In some embodiments, each chunk has a unique key, managed and stored securely at the server. In some embodiments, a "per share" global key is generated and chunk keys are derived from the global master key, instead of a blob master key.

In various embodiments, techniques disclosed herein may be used to store file system data that has been segmented into chunks of a first size to perform file system operations, such as de-duplication, in cloud-based object stores that may be optimized to store objects of a second size that is much larger than the first size.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of storing file system data, comprising:
computing a corresponding chunk hash value for each of a plurality of component chunks of file system data associated with an object, wherein a chunk hash value is based on at least a portion of data stored in a component chunk;
determining for the object a primary encryption key, wherein the object is comprised of the plurality of component chunks and the file system data is divided into a plurality of objects, each object of the plurality of objects having a corresponding primary encryption key;
storing the primary encryption key in a file system metadata table;
using the primary encryption key to generate, for each of said component chunks, a corresponding chunk key, wherein the corresponding chunk key is based at least in part on the primary encryption key and the corresponding chunk hash value associated with the corresponding chunk; and
providing chunk keys of the plurality of component chunks associated with the object to a file system client configured to create and store the object at least in part by encrypting each chunk included in the plurality of component chunks using a chunk key provided for that chunk to generate encrypted chunk data, and combining the encrypted chunk data to create and store the object.

2. The method of claim 1, wherein the primary encryption key is determined based at least in part on data comprising or otherwise associated with the plurality of component chunks.

3. The method of claim 1, wherein the chunk keys are not stored in file system metadata.

4. The method of claim 1, further comprising providing to the file system client an identification of the plurality of component chunks to be included in the object.

5. The method of claim 1, wherein the plurality of component chunks of file system data comprise at least a part of a file.

6. The method of claim 5, further comprising receiving a request to store the file, the request including data identifying the plurality of component chunks as being associated with the file.

7. The method of claim 1, further comprising receiving a request to access a file with which the plurality of component chunks are associated.

8. The method of claim 7, further comprising providing in response to the request a locator to be used to retrieve the object, and for each chunk a corresponding offset within the object and a corresponding chunk key to be used to decrypt the chunk.

9. A system, comprising:
a communication interface; and
a processor coupled to the communication interface and configured to:
compute a corresponding chunk hash value for each of a plurality of component chunks of file system data associated with an object, wherein a chunk hash value is based on at least a portion of data stored in a component chunk;
determine for the object a primary encryption key, wherein the object is comprised of the plurality of component chunks and the file system data is divided into a plurality of objects, each object of the plurality of objects having a corresponding primary encryption key;
store the primary encryption key in a file system metadata table;
use the primary encryption key to generate, for each of said component chunks, a corresponding chunk key, wherein the corresponding chunk key is based at least in part on the primary encryption key and the corresponding chunk hash value associated with the corresponding chunk; and
provide chunk keys of the plurality of component chunks associated with the object, via the communication interface, to a file system client configured to create and store the object at least in part by encrypting each chunk included in the plurality of component chunks using a chunk key provided for that chunk to generate encrypted chunk data, and combining the encrypted chunk data to create and store the object.

10. The system of claim 9, wherein the primary encryption key is determined based at least in part on data comprising or otherwise associated with the plurality of component chunks.

11. The system of claim 9, wherein the chunk keys are not stored in file system metadata.

12. The system of claim 9, wherein the processor is further configured to provide to the file system client an identification of the plurality of component chunks to be included in the object.

13. The system of claim 9, wherein the plurality of component chunks of file system data comprise at least a part of a file.

14. The system of claim 13, wherein the processor is further configured to receive a request to store the file, the request including data identifying the plurality of component chunks as being associated with the file.

15. The system of claim 9, wherein the processor is further configured to receive a request to access a file with which the plurality of component chunks are associated; and to provide in response to the request a locator to be used to retrieve the object, and for each chunk a corresponding offset within the object and a corresponding chunk key to be used to decrypt the chunk.

16. A computer program product to store file system data, the computer program product being embodied in a non-transitory computer readable storage medium and comprising computer instructions for:
computing a corresponding chunk hash value for each of a plurality of component chunks of file system data associated with an object, wherein a chunk hash value is based on at least a portion of data stored in a component chunk;
determining for the object a primary encryption key, wherein the object is comprised of the plurality of component chunks and the file system data is divided into a plurality of objects, each object of the plurality of objects having a corresponding primary encryption key;
storing the primary encryption key in a file system metadata table;
using the primary encryption key to generate, for each of said component chunks, a corresponding chunk key, wherein the corresponding chunk key is based at least in part on the primary encryption key and the corresponding chunk hash value associated with the corresponding chunk; and
providing chunk keys of the plurality of component chunks associated with the object to a file system client configured to create and store the object at least in part by encrypting each chunk included in the plurality of component chunks using a chunk key provided for that chunk to generate encrypted chunk data, and combining the encrypted chunk data to create and store the object.

* * * * *